United States Patent Office 3,168,609
Patented Feb. 2, 1965

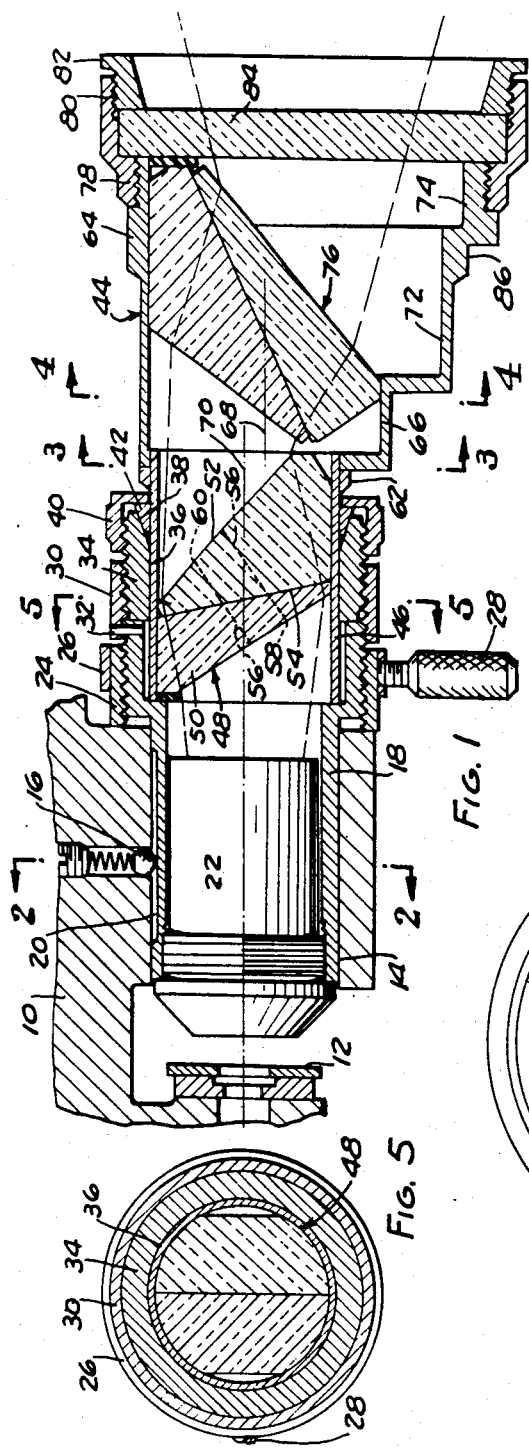

3,168,609
MOUNTED ANAMORPHIC PRISM SYSTEM
Harry Sidney Newcomer, P.O. Box 340, Cape May, N.J.
Original application Oct. 13, 1955, Ser. No. 540,182, now Patent No. 2,866,383, dated Dec. 30, 1958. Divided and this application Oct. 2, 1958, Ser. No. 764,900
2 Claims. (Cl. 88—57)

This is a division of my co-pending joint application with Arthur F. Anderson, Serial No. 540,182, filed October 13, 1955, now Patent No. 2,866,383.

This invention relates to anamorphic devices, more particularly to those of the general class used for the projection of wide screen motion pictures.

It is an object of the present invention to provide an anamorphoser of the prism type in which the mounting means for the prisms are simplified and at the same time made more reliable as well as economical to produce.

Another object is to provide an improvement for amateur motion picture projectors which will be readily adaptable to a wide variety of projector models.

A further object is to provide an anamorphic attachment which will mount in the place of the regular lens customarily provided on an amateur motion picture projector, and which will provide for focusing the objective lens without requiring rotation of the anamorphoser, and yet which will not require modification of the motion picture projector.

Another object is to provide an improved and simplified achromatic prism conformation, whereby the prism may be attached to its mount with its location being established by means of an external cylindrical edge.

A further object is to provide an improved prism anamorphoser having front and rear achromatic prisms in which the mount is so arranged that orientation of the prisms, with respect to each other, may be readily established prior to final assembly.

Further objects and advantages of the present invention will be apparent from the following description, reference being had to the accompanying drawing wherein a preferred form of the present invention is clearly shown.

In the drawing:

FIGURE 1 is a cross-sectional view taken in a horizontal plane of an anamorphic device embodying a preferred form of the present invention.

FIGURE 2 is a cross-sectional view taken on line 2—2 of FIGURE 1.

FIGURE 3 is a cross-sectional view taken on line 3—3 of FIGURE 1.

FIGURE 4 is a cross-sectional view taken on line 4—4 of FIGURE 1.

FIGURE 5 is a cross-sectional view taken on line 5—5 of FIGURE 1.

Referring now to FIGURE 1, there is shown at 10 a portion of the frame of a motion picture projector. The frame 10 has a film gate, designated 12, and a cylindrical bore 14 which normally receives the conventional screw-threaded objective lens barrel by means of which light rays projected through the film are brought into focus upon the surface of a screen, not shown. The frame 10 is provided with a spring-loaded ball detent 16 which cooperates normally with a thread upon the standard lens barrel to provide quick longitudinal insertion and removal of the barrel, together with fine focusing by rotation of the barrel which causes the detent 16 to perform the function of a nut.

The anamorphic device of the present invention comprises a receiver sleeve 18, which is provided with a keyway 20, adapted to receive the ball detent 16, to establish a predetermined angular relationship of the receiver 18 of the bore 14 while permitting longitudinal movement of the same. Threaded in the left-hand end of the receiver 18 is an objective lens cartridge 22, which is of conventional construction.

The receiver sleeve 18 is provided with external threads upon its enlarged right-hand end. These threads are engaged with a focusing stop sleeve 24, which normally abuts against the right-hand face of the projector frame 10 adjacent the end of bore 14. A ring 26 surrounds the stop sleeve 24 and has a combined set screw and focusing knob 28 threaded therethrough. At the extreme right-hand end of the receiver 18 a threaded coupling sleeve 30 is provided, and is suitably secured to the receiver 18, as by the dowel pin 32.

Mounted in the internal threads of the sleeve 30 is an externally threaded ring 34 having a cylindrical internal bore 36 with a conical portion 38 at its right-hand end. A nut 40 is screwed on the right-hand end of sleeve 34 and engages a tapered split ring 42 so as to be radially contractable by tightening of the nut 40.

Slidably received in the bore 36 and ring 42 is a prime anamorphoser, generally designated 44. This comprises a straight cylindrical sleeve 46, forming the rear section of the anamorphoser. The sleeve 46 carries an achromatic prism 48, which consists of two sections, 50 and 52, cemented together along the plane 54. The prism 48 has an external surface or edge, which is cylindrical in form to mate with the internal surface of the sleeve 46 with a snug sliding fit. The prism 48 is retained in the sleeve 46 by a suitable cement. This forms the means by which the positional location of the prism within the sleeve 46 is established and maintained.

In order to secure a firm and permanent location, the cylindrical surface of the glass need not be continuous, that is, it may be interrupted by flats of reasonable magnitude at one or more locations around the periphery. It is only essential that sufficient cylindrical area be provided so that the only relative motion between the prism and the sleeve, which is possible, is a fore and aft sliding motion or an angular relative rotation about the central axis of the sleeve 46.

In other words, there must be on the glass sufficient cylindrical area to prevent relative angular rotation between the glass and the sleeve in the plane of FIGURE 1. If, for example, the cylindrical surface be interrupted by a flat, such as indicated at the dotted lines 54 and 56, the rearmost corner 58 of the lower cylindrical surface must lie to the rear, axially, of the foremost corner 60 of the upper cylindrical surface.

Near its right-hand end the sleeve 46 has rigidly secured thereto a shoulder ring 62, which may be soldered or brazed to the sleeve 46 prior to assembly of the glass therein. Fitted over the projecting end of sleeve 46, and engaging the right-hand face of shoulder ring 62, is a front mounting sleeve 64. The front section is provided with a prism receiving bore 66, the axis of which is indicated at 68 and is offset downwardly in the plane of FIGURE 1 from the axis 70 of the sleeve 46. The upper edge of the bore 66 in FIGURE 1 extends all the way to the right-hand end of the front section 64.

A second eccentric bore 72 is located forwardly in bore 66 and is approximately tangent to the upper portion of bore 66. An achromatic prism 76 is mounted in the bore 66 and is provided with a cylindrical surface in the same manner as the prism 48.

The external end of the front section 64 may be provided with threads 78 to receive an auxiliary holding ring 80, which receives a threaded internal gland 82, whereby auxiliary optical accessories, such as a filter 84, may be mounted in front of the anamorphoser. The external surface of the front section 64 has eccentric sections similar to the eccentric bores 66, 72, and 74. There is also provided a flat 86 on the lower side of the device, which may be used with a straight edge for the purpose of aligning the anamorphoser in use.

In operation, the anamorphic attachment is positioned in the bore 14 in place of the standard objective projection lens normally provided with the projector. The objective cartridge 22 will project the light rays so that they will form an image on the screen and the prisms 48 and 76 magnify this image (upwardly and downwardly in FIGURE 1) so as to substantially increase its width. The magnification ratio may be whatever is desired, a standard ratio in professional moving pictures being 2:1.

The objective may be focused by tightening the set screw handle 28 to frictionally engage the ring 26 upon the threaded focusing stop ring 24. By then rotating the stop ring 24, and at the same time manually exerting pressure on the knob 28 toward the left in FIGURE 1, the entire receiver sleeve 18 and anamorphoser 44 may be precisely adjusted to the left or the right to bring the image into focus. This does not disturb the angular relationship between the projector and the magnification plane of the anamorphoser since the detent 16, being engaged in the keyway 20, prevents angular rotation of the receiver 18 in the bore 14. That relationship may be changed by loosening nut 40 and turning the anamorphoser in bore 36.

It will be noted that the anamorphoser 44 may be readily aligned during assembly by rotating the front section 44 relative to the rear sleeve 46. When the prisms have each been mounted in their respective mount sections, the front mount section 44 is slipped over the nose of the sleeve 46, preferably with the application of an adhesive cement. Before the cement is set, the assembly may be mounted in an optical checking fixture, and the front section 64 may then be rotated relative to the sleeve 46 to bring the active plane of horizontal magnification of the front prism 76 into alignment with the corresponding plane of the rear prism 48.

It will thus be seen that the present invention provides an improved anamorphic attachment for amateur moving picture projectors, which is readily installed in place of the conventional objective lens, which may be easily focused without disturbing the active plane of horizontal magnification of the anamorphoser.

The invention further provides for an improved mounting for achromatic prisms, which is simple, reliable, and economical in space. In addition, the mount provides for ready alignment of the front and rear prisms during the assembly operation.

While the form of embodiment of the invention as herein disclosed constitutes a preferred form, it is to be understood that other forms might be adopted, all coming within the scope of the claims which follow.

What is claimed is as follows:

1. A mounted anamorphic prism system comprising a pair of cemented achromatic prisms inclined at substantial angles to the axis of the mount and disposed in opposite directions thereto in which at least one prism of the pair is edged cylindrically along an axial distance greater than the approximate radius of the cylinder to fit into a straight cylindrical sleeve of the mount and be held therein against tilting and is further cemented therein in a fixed position determined solely by the cement bond between the cylindrical edge and the inner wall of the sleeve.

2. A mounted anamorphic prism system comprising a pair of cemented achromatic prisms inclined at substantial angles to the axis of the mount and disposed in opposite directions thereto in which at least one prism of the pair is edged cylindrically along an axial distance greater than the approximate radius of the cylinder to fit into a straight cylindrical sleeve of the mount and be held therein against tilting and is further secured thereto solely by cementing the cylindrical edge of the prism to the interior of the sleeve.

References Cited in the file of this patent
UNITED STATES PATENTS

| | | |
|---|---|---|
| 1,781,501 | Ford | Nov. 11, 1930 |
| 2,375,634 | Dunning | May 8, 1945 |
| 2,729,154 | De Grave et al. | Jan. 3, 1956 |
| 2,828,670 | Luboshez | Apr. 1, 1958 |
| 2,843,015 | Luboshez | July 15, 1958 |
| 2,866,383 | Newcomer et al. | Dec. 30, 1958 |